(12) United States Patent
Qi et al.

(10) Patent No.: US 9,354,404 B2
(45) Date of Patent: May 31, 2016

(54) DATACENTER OPTICS (DCO) EDGE MOUNT TRANSCEIVER ASSEMBLY AND PLUG CONNECTOR

(71) Applicants: Qi Qi, San Jose, CA (US); Jamyuen Ko, Santa Clara, CA (US); Chun Chit Lam, San Jose, CA (US)

(72) Inventors: Qi Qi, San Jose, CA (US); Jamyuen Ko, Santa Clara, CA (US); Chun Chit Lam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 13/730,537

(22) Filed: Dec. 28, 2012

(65) Prior Publication Data
US 2014/0185988 A1    Jul. 3, 2014

(51) Int. Cl.
*G02B 6/36*    (2006.01)
*G02B 6/38*    (2006.01)
*G02B 6/42*    (2006.01)

(52) U.S. Cl.
CPC ............. *G02B 6/3897* (2013.01); *G02B 6/428* (2013.01); *G02B 6/4246* (2013.01); *G02B 6/4293* (2013.01); *G02B 6/3817* (2013.01); *G02B 6/3849* (2013.01); *G02B 6/3853* (2013.01); *G02B 6/3885* (2013.01);
(Continued)

(58) Field of Classification Search
CPC ...... G02B 6/36; G02B 6/3628; G02B 6/3644; G02B 6/42; G02B 6/4201; G02B 6/4219; G02B 6/4246; G02B 6/426; G02B 6/4261; G02B 6/423; G02B 6/4238
USPC ............. 385/53, 76–77, 88–93; 398/135–139
See application file for complete search history.

(56) References Cited

U.S. PATENT DOCUMENTS 6,350,063 B1 *  2/2002  Gilliland et al. ................. 385/88
6,666,484 B1 * 12/2003  Branch et al. .................. 292/128
(Continued)

FOREIGN PATENT DOCUMENTS

JP         2010-85805 A        4/2010

OTHER PUBLICATIONS
PCT/2013/046411 Notification of Transmittal of the International Search Report and the Written Opinion of the International Searching Authority, or the Declaration, mailed Nov. 26, 2013, 11 pages.
(Continued)

*Primary Examiner* — Ryan Lepisto
*Assistant Examiner* — Guy Anderson
(74) *Attorney, Agent, or Firm* — Blakely, Sokoloff, Taylor & Zafman LLP

(57) ABSTRACT

Embodiments include a high bandwidth optical connection system suitable for interconnecting servers, for example within a rack of a datacenter. An edge mount optical connector assembly includes an edge-mount housing providing top-side socket contacts proximate to a first end of the housing and a port at a second end to receive an optical plug connector. A socket latch cantilevered from an anchor point on the housing includes a latching face to contact a keeper face disposed on the housing and a spring load application surface between the anchor point and the latching face to apply a spring force against the electrical contacts for retention of a removable optical transceiver module. An optical plug connector includes a front housing joined to a rear housing with a plug lens spring loaded within the housing and with alignment features comprising two flat alignment surfaces orthogonally oriented relative to each other.

10 Claims, 12 Drawing Sheets

(52) U.S. Cl.
CPC .......... *G02B 6/3893* (2013.01); *Y10T 29/4973* (2015.01); *Y10T 29/49721* (2015.01)

(56) References Cited

U.S. PATENT DOCUMENTS

| | | | |
|---|---|---|---|
| 6,821,027 B2* | 11/2004 | Lee et al. | 385/89 |
| 6,873,800 B1* | 3/2005 | Wei et al. | 398/138 |
| 6,935,882 B2* | 8/2005 | Hanley et al. | 439/372 |
| 6,986,679 B1* | 1/2006 | Aronson et al. | 439/374 |
| 7,013,088 B1* | 3/2006 | Jiang et al. | 398/139 |
| 8,636,544 B1* | 1/2014 | Briant et al. | 439/607.25 |
| 2002/0009905 A1 | 1/2002 | Poplawski et al. | |
| 2003/0068140 A1 | 4/2003 | Brezina et al. | |
| 2003/0086660 A1* | 5/2003 | Brezina et al. | 385/88 |
| 2003/0171022 A1 | 9/2003 | Distad et al. | |
| 2004/0131317 A1 | 7/2004 | Grzegorzewska et al. | |
| 2011/0229083 A1 | 9/2011 | Dainese, Jr. et al. | |
| 2011/0305417 A1* | 12/2011 | Wang et al. | 385/39 |
| 2011/0317964 A1 | 12/2011 | Downs | |
| 2012/0243837 A1 | 9/2012 | Ko et al. | |

OTHER PUBLICATIONS

Office Action and Taiwan Search Report from foreign counterpart Taiwan Patent Application No. 102142258, mailed Feb. 10, 2015, 6 pages.

\* cited by examiner

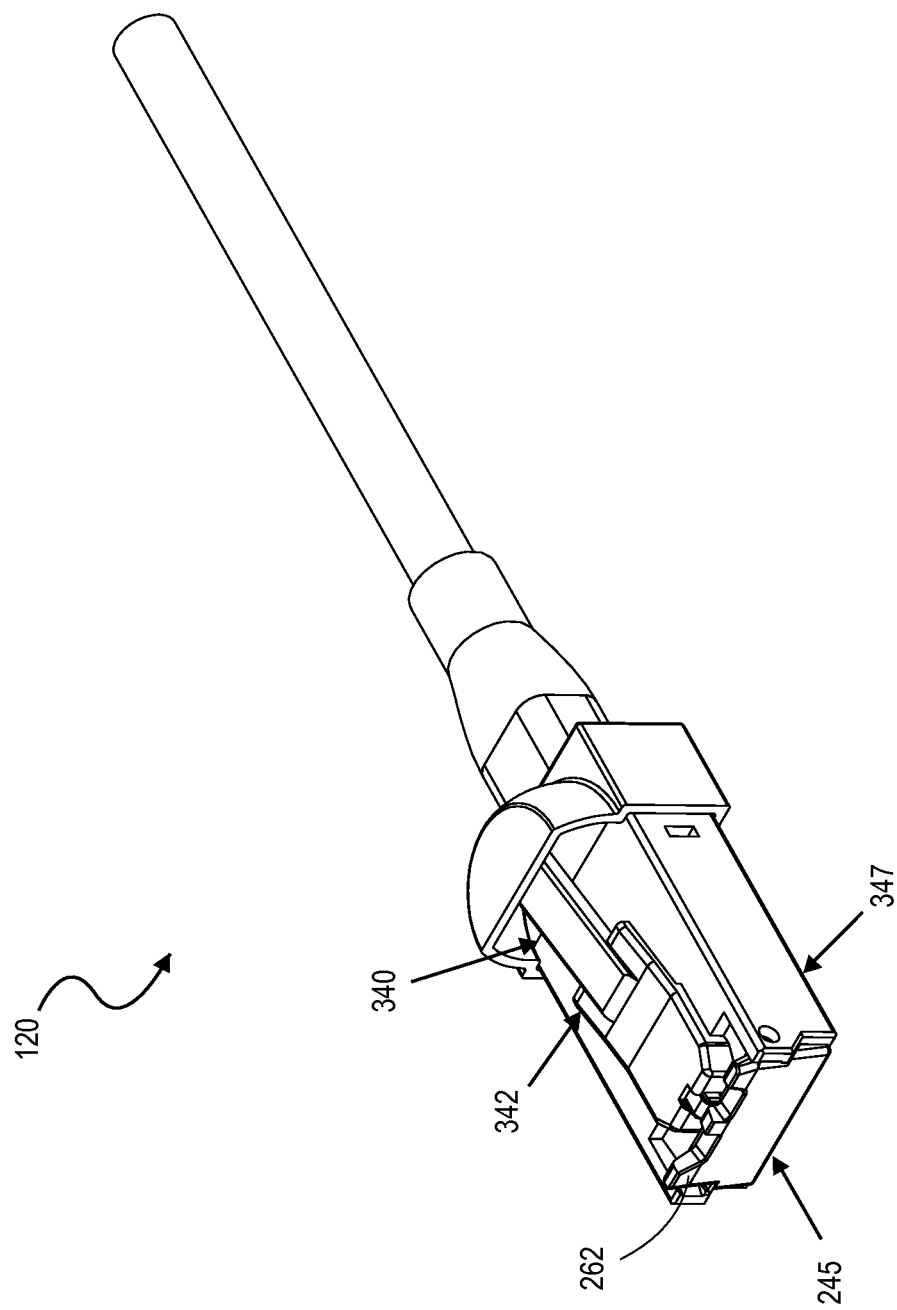

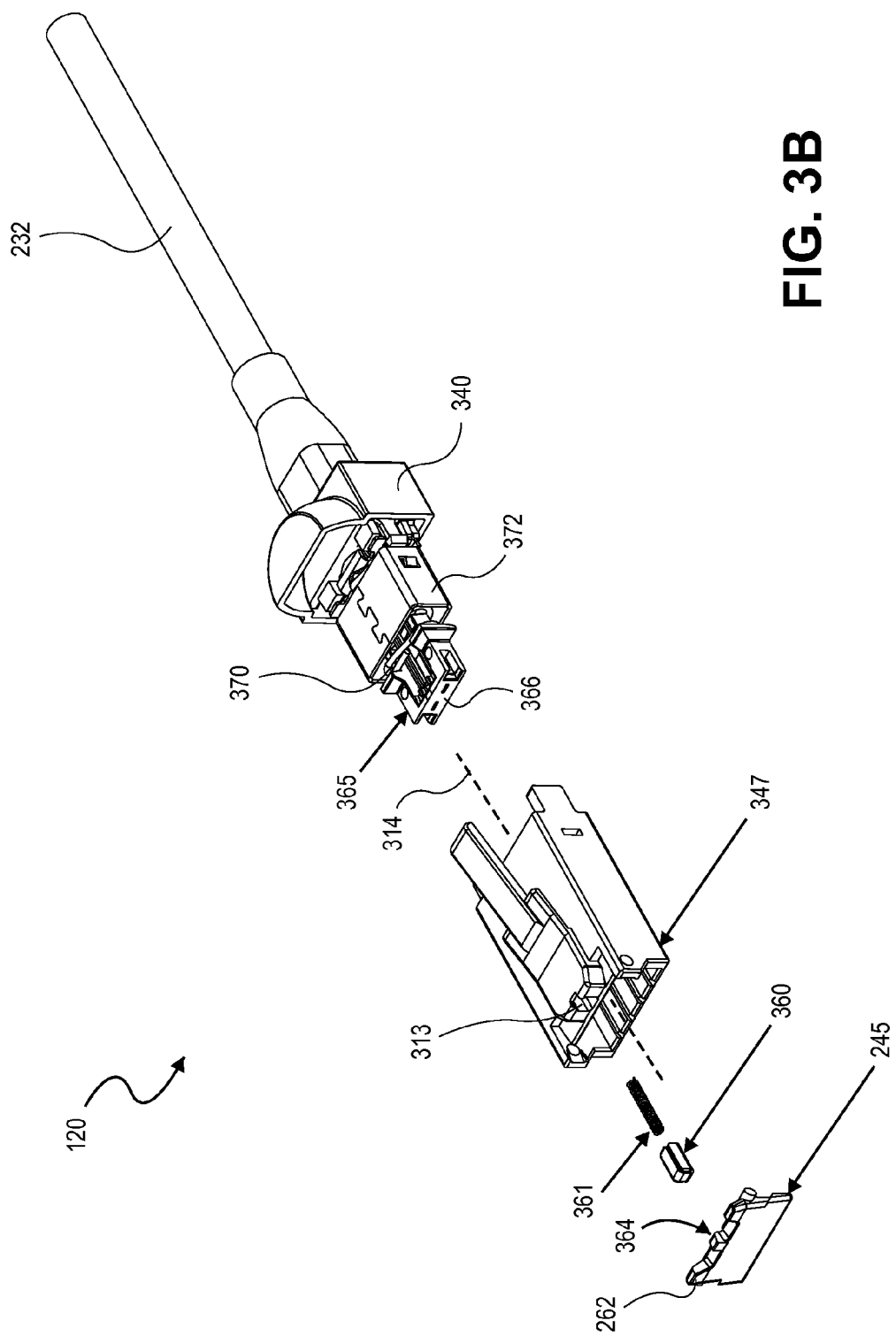

DATACENTER OPTICS (DCO) EDGE MOUNT TRANSCEIVER ASSEMBLY AND PLUG CONNECTOR

TECHNICAL FIELD

Embodiments of the invention generally relate to optical communication connectors, and more particularly pertain to plug connectors and edge mount optical transceiver assemblies.

BACKGROUND

Recent trends in computing, such as cloud computing, are placing ever greater demands on datacenter network bandwidth. A modern datacenter contains tens of thousands of servers with racks of tens of machines per rack. There is interest in utilizing more fiber in the datacenter for interconnection between these many servers as a critical bottom link in the interconnect fabric of the datacenter.

Existing optical interconnect systems, such as the Quad Small Form-factor Pluggable (QSFP/QSFP+) are now at data rates of 10 Gb/s, but are not easily scalable to higher bandwidths, such as 40 Gb/s, as demand grows. With the great multiplicity of server machines, a lack of scalability at the bottom level of the datacenter network fabric is particularly onerous. Costs associated with existing solutions are also high.

A low cost, high bandwidth optical connection offering scalability would advantageously speed the datacenter industry's transition from copper interconnects.

BRIEF DESCRIPTION OF THE DRAWINGS

Embodiments of the present invention are illustrated by way of example, and not limitation, in the figures of the accompanying drawings in which:

FIG. 3A is an isometric view of the optical plug connector illustrated in FIG. 2, in accordance with an embodiment;

FIG. 3B is an isometric exploded view of the optical plug connector illustrated in FIG. 3A, in accordance with an embodiment;

DETAILED DESCRIPTION

In the following description, numerous details are set forth. It will be apparent, however, to one skilled in the art, that the present invention may be practiced without these specific details. In some instances, well-known methods and devices are shown in block diagram form, rather than in detail, to avoid obscuring the present invention. Reference throughout this specification to "an embodiment" or "in one embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not structurally or functionally exclusive of the other.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

Described herein are embodiments of an optical plug cable assembly and edge mount optical transceiver assembly that pair together to form a system suitable for high speed optical communication between electronic devices, such as but not limited to servers within a rack, or between adjacent racks in a data center. One, some, or all of the features of the assembly embodiments described herein may be provided in one or more version of a high speed optical communication interconnect system that supports the standards and specifications SFF-8436.

Figure 1:
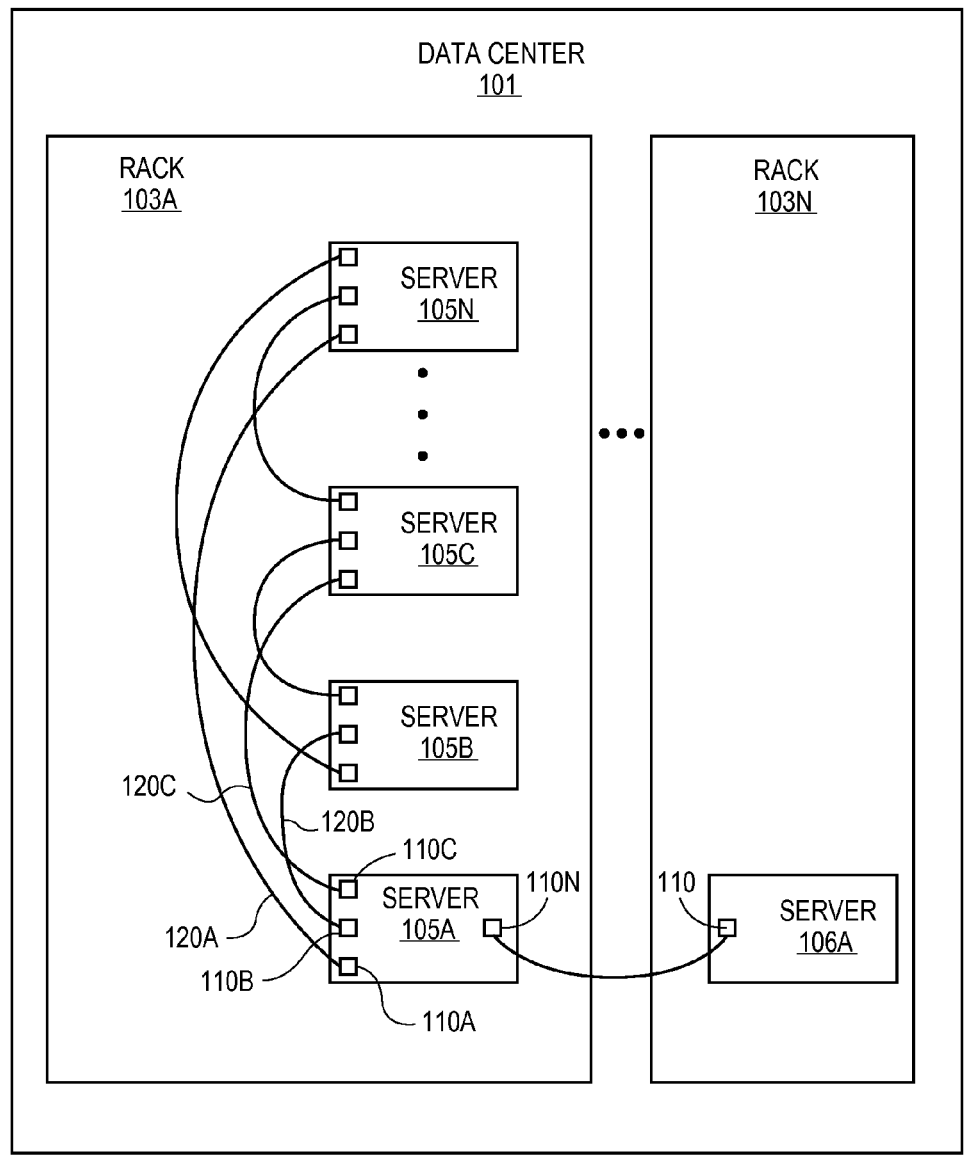
FIG. 1 is a schematic of a datacenter employing an edge mount optical connection system in accordance with an embodiment.

FIG. 1 is a schematic of a datacenter 101 employing an edge mount optical connection system in accordance with an embodiment. The datacenter 101 includes a plurality of server racks 103A through 103N. Each server rack (e.g., 103A) includes a plurality of server machines 105A, 105B, 105C, etc., through 105N. As used herein, a server machine is a physical computer (a computer hardware system) including at least one logic processor, such as, but not limited to a Xeon® Processor commercially available from Intel® Corp. Each of the server machines includes at least one edge mount optical transceiver assembly 110A, and may further include a plurality of such edge mount optical transceiver assemblies (e.g., 110B, 110C etc., through 110N). Each of the edge mount optical transceiver assemblies provides a physical port to which an optical plug cable assembly (e.g., 120A, 120B, 120N) is mated. The optical plug connector assemblies then form a physical link between edge mount optical transceiver assemblies in separate machines (e.g., intra-rack connections between server machines 105A-105N or server machine a TOR switch, inter-rack connections between server machines 105A-106A, etc.).

Figure 2:
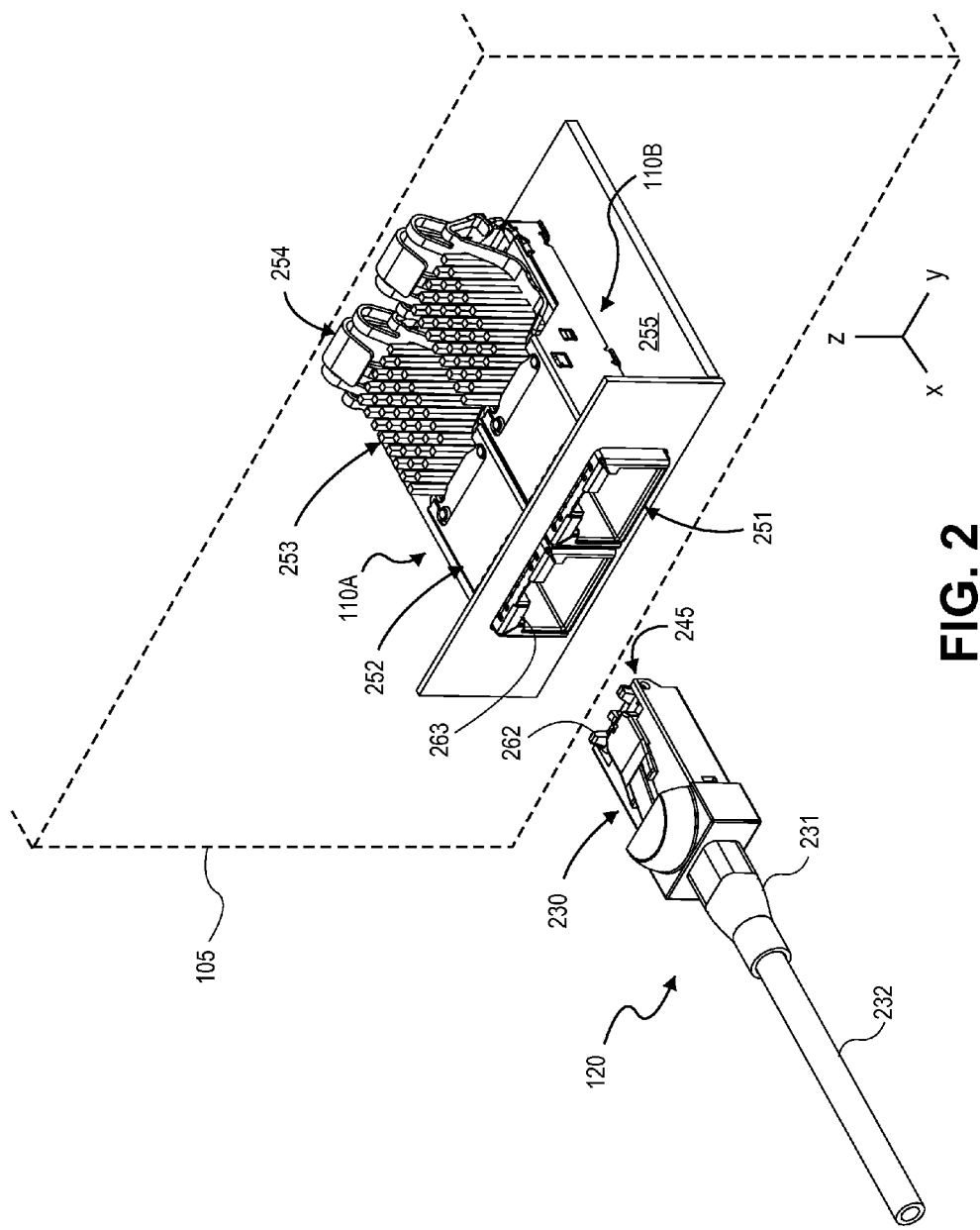
FIG. 2 is an isometric view of an optical plug connector and an edge mount optical transceiver assembly utilized in the edge mount optical connection system of FIG. 1, in accordance with an embodiment.

FIG. 2 is an isometric view of an optical plug cable assembly 120 and a pair of edge mount optical transceiver assemblies 110A, 110B utilized in the edge mount optical connection system of FIG. 1, in accordance with an embodiment. As shown, each optical transceiver assembly 110A, 110B is disposed on a printed circuit board (PCB) 255. In the exemplary embodiment, each optical transceiver assembly 110A is reflow soldered onto the PCB 255. Through the solder connections to the PCB 255, an optical transceiver module disposed within the optical transceiver assembly 110A is electrically coupled with other components of the server machine 105, for example by any conventional electrical communication bus. The optical transceiver assemblies 110A, 110B each include an edge-mount housing 251 having a physical port (female) at the edge of the server machine 105 configured to receive the plug connector 230 of the plug cable assembly 120. Each transceiver assembly 110A, 110B further includes a metallic outer shield 252, which is of sheet metal for example, and stamped to surround at least a top surface, and advantageously, three sides of the edge-mount housing 251. The outer shield 252 is tied to a reference (e.g., ground) potential on the PCB 255 and is to cover external surfaces an optical transceiver module thereby protecting it from electromagnetic radiation. Disposed within a top side opening of the outer shield 252 is a heat sink 253 and a socket latch 254 operable to apply a spring force against a flange of the heat sink 253 and further operable to apply a spring force against a keeper surface in the outer shield 252, or housing 251 when engaged, as described further elsewhere herein.

Advantageously, the edge mount optical transceiver assembly embodiments described herein enable field replacement of an optical transceiver module from the edge mount optical transceiver assembly while the edge-mount housing 251 remains soldered to the PCB 255 and re-usable. In certain embodiments, optical transceiver modules are field-swappable without removal of the PCB 255 from the server machine 105. The ability to swap optical transceiver modules in the field improves both server uptime through ease of maintenance of the optical link and also provides bandwidth scalability. For example a 10 Gb/s data rate capable transceiver module can be simply replaced with a 40 Gb/s data rate capable transceiver module.

FIG. 2 further illustrates a forward-facing rear side view of exterior surfaces of a plug cable assembly 120 configured to mate with the edge-mount housing 251. The plug cable assembly 120 includes a raw cable assembly 232, which in the exemplary embodiment is round, and includes a plurality of optical fibers and, in certain embodiments, further includes a plurality of electrical (copper) wires. For hybrid optical-electrical embodiments where the raw cable assembly 232 includes electrical wires, any of micro-coax wire, twisted-pair wire, or individual insulated wire may be utilized for either signal transmission (e.g., USB, I2C, UART, etc.), or power coupling. The raw cable assembly 232 couples to the plug connector assembly 230 with a strain relief boot 231 disposed there between. Typically, a second plug connector assembly 230 is present on a second end of the raw cable assembly 232, for example to optically couple two server machines in the system 100. As further denoted in FIG. 2, the mating end of the plug cable connector assembly 230 includes a cantilevered door 245. The door 245 is closed upon disengagement with a mating optical transceiver port to reduce particle contamination of a jumper lens disposed within the plug connector assembly 230. The door 245 is pivotable about an axis upon application of pressure to the lever faces 262 administered by corresponding actuation surfaces 263 formed in the edge-mount housing 251 as the plug cable assembly 120 is displaced along the x-axis during an insertion operation.

FIG. 3A is rear-facing front side isometric view of the exterior surfaces of the optical plug cable assembly 120, in accordance with an embodiment. As shown, the cantilevered door 245 spans the transverse width of a front face of the plug cable assembly 120 and is pivotably affixed to a front housing 347 having a closed rectangular form and a depressable plug latch 342 extending from a first (e.g., top) surface. The latch 342 may be of any conventional form, such as, but not limited to, those employed in an RJ45 or LC plug connector. The front housing 347 is sized to mate with a rear housing 340. In the exemplary embodiment, the rear housing 340 has a closed rectangular form of substantially the same dimension as the front housing 347.

FIG. 3B is an isometric exploded view of the optical plug cable assembly 120, in accordance with an embodiment. As shown, a coil door return spring 361 and a spring guide 360 is to be disposed within a cavity 313 in the front housing 347. The spring guide 360 has five sides to enclose an end length of the door return spring 361 and further to slide along a length of the cavity 313 so as to direct the spring force of the door return spring 361 against a door lever face 364 and thereby maintain the door 245 in a closed position against a front edge of the front housing 347 when the front housing 347 is not mated to an optical transceiver assembly (e.g., when not disposed within the edge-mount housing 251 in FIG. 2).

As further illustrated in FIG. 3B, the front housing 347 encloses a plug lens 365 that is bonded to optical fibers of the raw cable assembly 232. Surrounding the fiber is a conductive inner shield 372, which may be of stamped sheet metal for example, to protect the fibers from electromagnetic radiation. Within the inner shield 372 is an internal coil spring 370 which is disposed against the plug lens 365 and a distal end of the inner shield 372 to provide a compressive spring force operable for abutting the plug lens face 366 with mating surfaces in an optical transceiver assembly so as to ensure good light coupling between the jumper lenses and the optical transceiver. The internal coil spring 370 further permits the plug lens 365 to float within the confines of the front housing 347 for ease of engagement. In the exemplary embodiment, the internal coil spring 370 has elongated oval or rectangular turns following the internal rectilinear form of the inner shield 372 so as to provide clearance for passage of fibers arranged in parallel along a same plane (e.g., in a ribbon cable configuration) aligned with the longer length of the coil turns. A round spring in contrast would require a larger dimensioned front housing 347 or disadvantageously limit clearance for fibers coupling to an array of optical lenses, described further elsewhere herein.

Figure 3C:
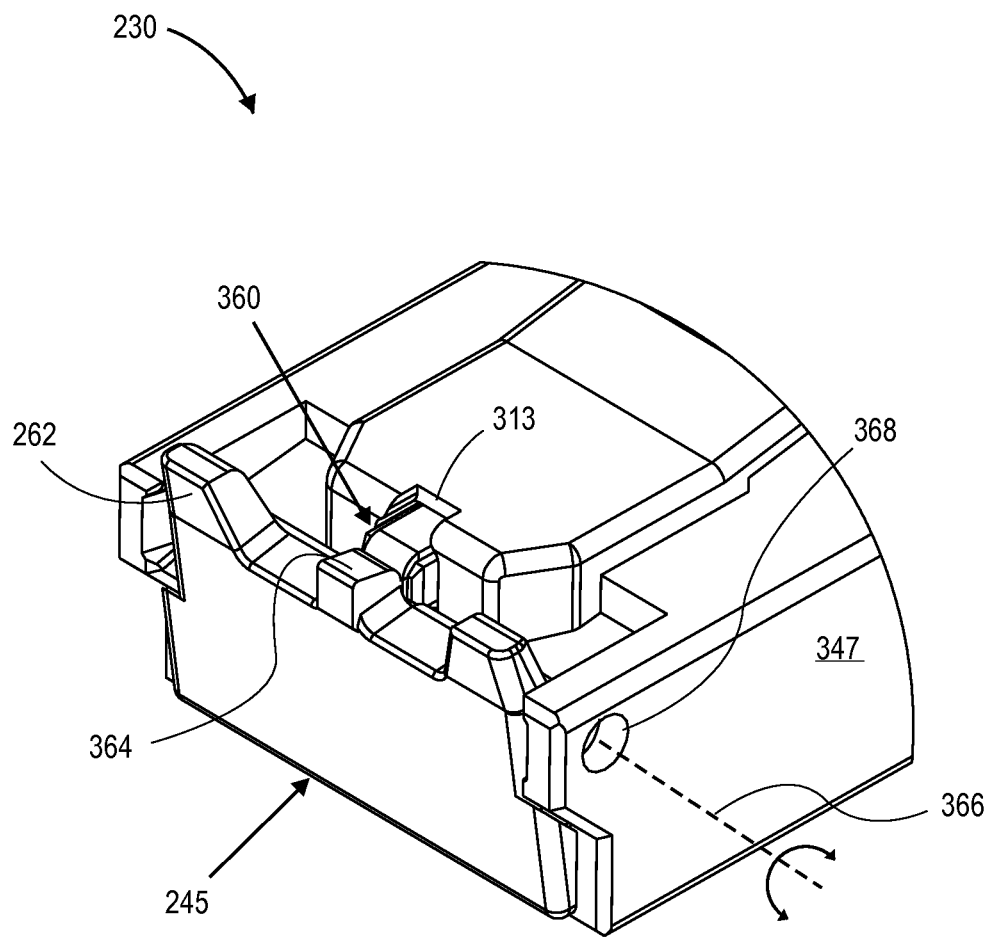
FIG. 3C is an expanded isometric view of the optical plug connector illustrated in FIG. 3B, in accordance with an embodiment.

FIG. 3C is an expanded isometric view of a front side external surface of the optical plug connector assembly 230, further illustrating the cantilevered door 245 in assembled form, in accordance with an embodiment. As shown, pivot axles on opposite sides of the door 245 are attached at sockets 368 formed in the front housing 347 allowing for the door to pivot about a transverse pivot axis 366 extending proximate to, and parallel with, a top edge of the front housing 247 in response to force applied against the lever face 262 sufficient to displace the door spring guide 360 into the 313 against the force of the door return spring 361. Notably, with only a pivoting of the door 245 during insertion/removal of the plug connector 230, the number of sliding surfaces is reduced relative to a design employing a retractable door to the benefit of greater plug connector reliability and/or reduce particulate generation.

Figure 3D:
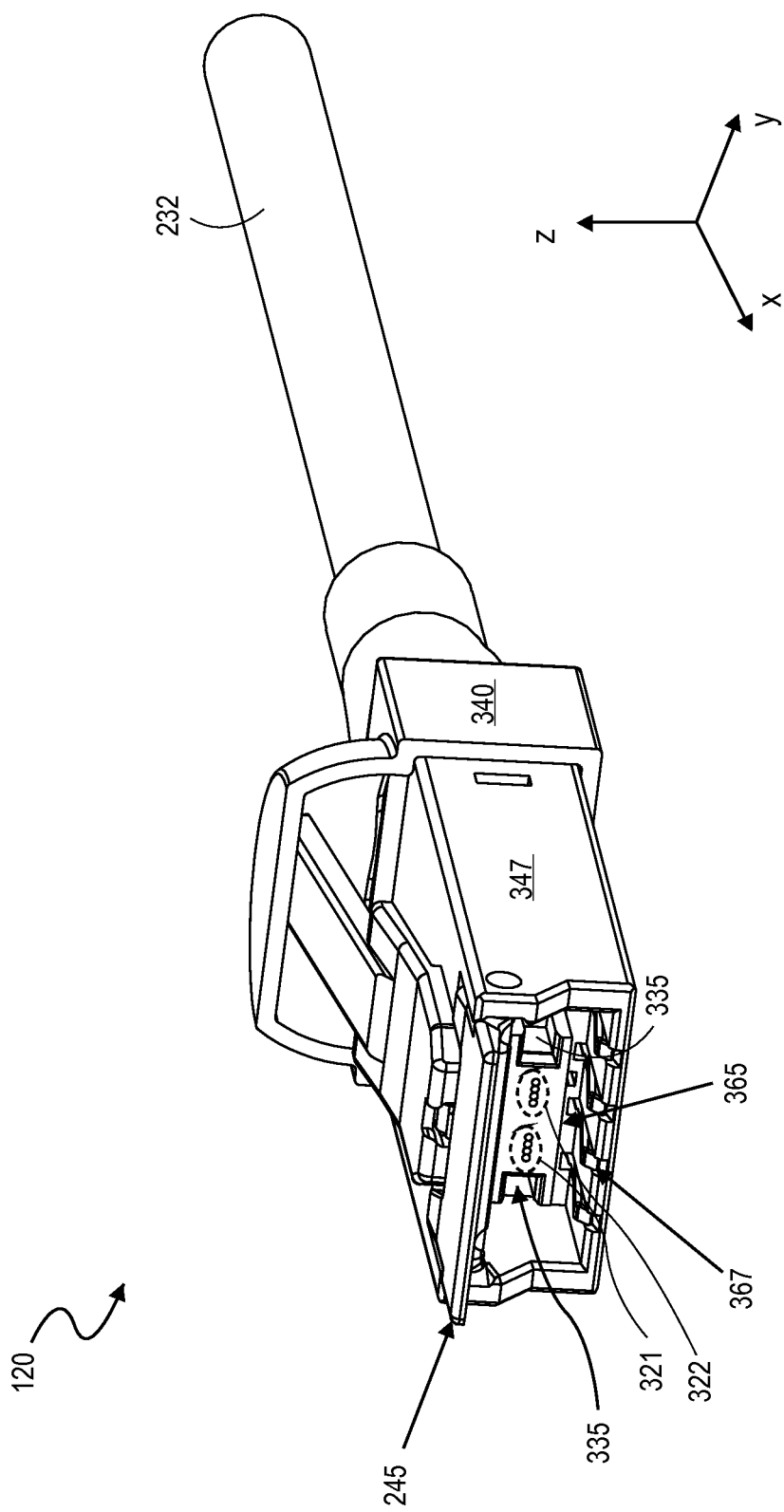
FIG. 3D is an isometric view of a plug lens disposed within the optical plug connector in FIG. 3A, in accordance with an embodiment.

FIG. 3D is an isometric view of the plug lens 365 disposed within the optical plug connector assembly 230 and the cantilevered door 245 in open position, in accordance with an embodiment. In this exemplary hybrid connector embodiment, disposed below the plug lens 365 is a plurality of electrical contacts 367, which are connected (e.g., soldered) to electrical signal and/or power wires in the raw cable assembly 232. While such fiber-plus-copper is illustrated, fiber-only embodiments are of course also possible with the electrical contacts 367 then terminated or completely absent.

Also depicted in FIG. 3D is the front face of the plug lens 365. The plug lens 365 is generally of a moldable high temp material having optical properties (e.g., refractive index, etc.) suitable for a jumper lens. In the exemplary embodiment, the plug lens 365 is from the Ultem family of PEI products manufactured by SABIC. Central on the plug lens face are a transmit ($T_x$) lens array 321 and a receive ($R_x$) lens array 322. Each of the lens arrays include one row of four curved lens surfaces (i.e., 1×4 lens array), for a total of eight optical fiber terminals in the plug lens 365. Of course, a larger number of lenses is also possible. Each lens in the array is shaped to collimate light to/from each fiber and reduce coupling loss because of particle contamination. Notably the $T_x$ and $R_x$ lens arrays 321, 322 are separately grouped together and laterally separated, for example by approximately 1 mm. This particular configuration has been found to enable efficient trace routing within the optical transceiver module disposed within the edge mount transceiver assembly. As such, the lateral separation of the $R_x$ and $T_x$ lens arrays illustrated is advantageous over alternatives, such as a 1×8 lens array for example.

Figure 3E:
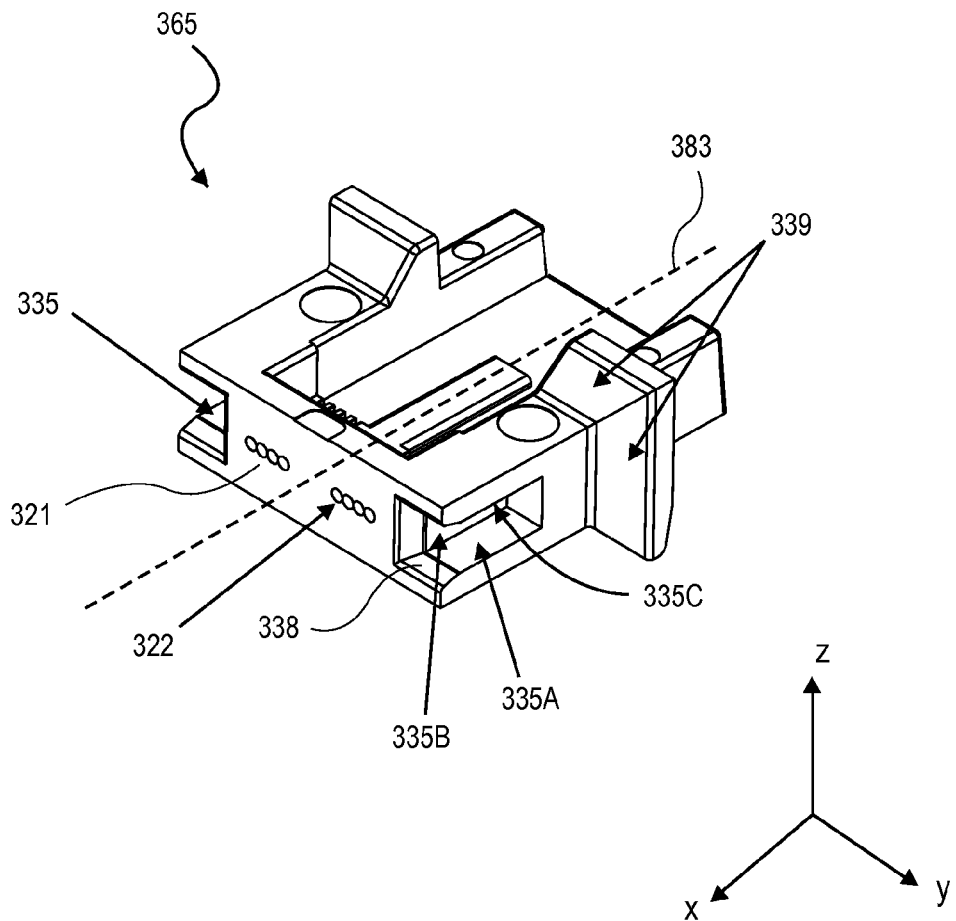
FIG. 3E is an isometric view of front surface of the plug lens depicted in FIG. 3D, in accordance with an embodiment.

In the embodiment illustrated in FIG. 3D, the plug lens 365 further includes two alignment features 335 at opposite sides of the plug lens front face. FIG. 3E is an expanded isometric view of the front surface of the plug lens depicted in FIG. 3D, in accordance with an embodiment. As shown in FIG. 3E, the alignment features 335 are three sided channels molded, or otherwise formed into opposing sides of the plug lens 365. In the exemplary embodiment, the alignment feature surfaces 335A, 335B, and 335C are all flat (not curved) and substantially orthogonal to each other. The orthogonality of the alignment surfaces 335A, 335B, 335C is advantageous for aligning the plane of the lens arrays 321, 322 precisely with optics of the optical transceiver module disposed within an edge mount transceiver assembly, as described further elsewhere herein. The plug lens 365 further includes multiple self-centering surfaces. First self-centering surfaces 338 are internal edge chamfers, for example flat surfaces at 15°-30° relative to the respectively joined alignment surfaces 335A, 335B, 335C, disposed on the front face of the plug lens 365. The self-centering surfaces 338 are to impart a lateral force on the spring-loaded/supported (i.e., floating) plug lens 365 through interference with a corresponding (square) post disposed on the optical transceiver module. Second self-centering surfaces 339 are external edge chamfers that are oriented non-orthogonally to the front jumper lens face 366 and symmetrical about at least one plane passing through a center of the front face 366. For example, one pair of self-centering surfaces 339 is at 45° relative to an x-z plane passing through the longitudinal axis 383. The self centering surfaces 339 are to impart a lateral force on the spring-loaded/supported plug lens 365 through interference with a corresponding interior surface (e.g., 45° complement of the centering surfaces 339) of the front housing 347 when the plug connector 120 is not engaged with a transceiver module assembly. A second pair of self-centering surfaces 339, orthogonal to the first, are at 45° relative to the y-z plane. These laterally directed forces center the spring-loaded, floating plug lens 365 with the longitudinal axis 314 (FIG. 3B) of the front housing 347. The centering with respect to the front housing 347 then properly positions the alignment features 335 relative to the corresponding optical transceiver module alignment feature upon insertion of the front housing 347 into a port of the edge mount transceiver assembly.

Figure 3F:
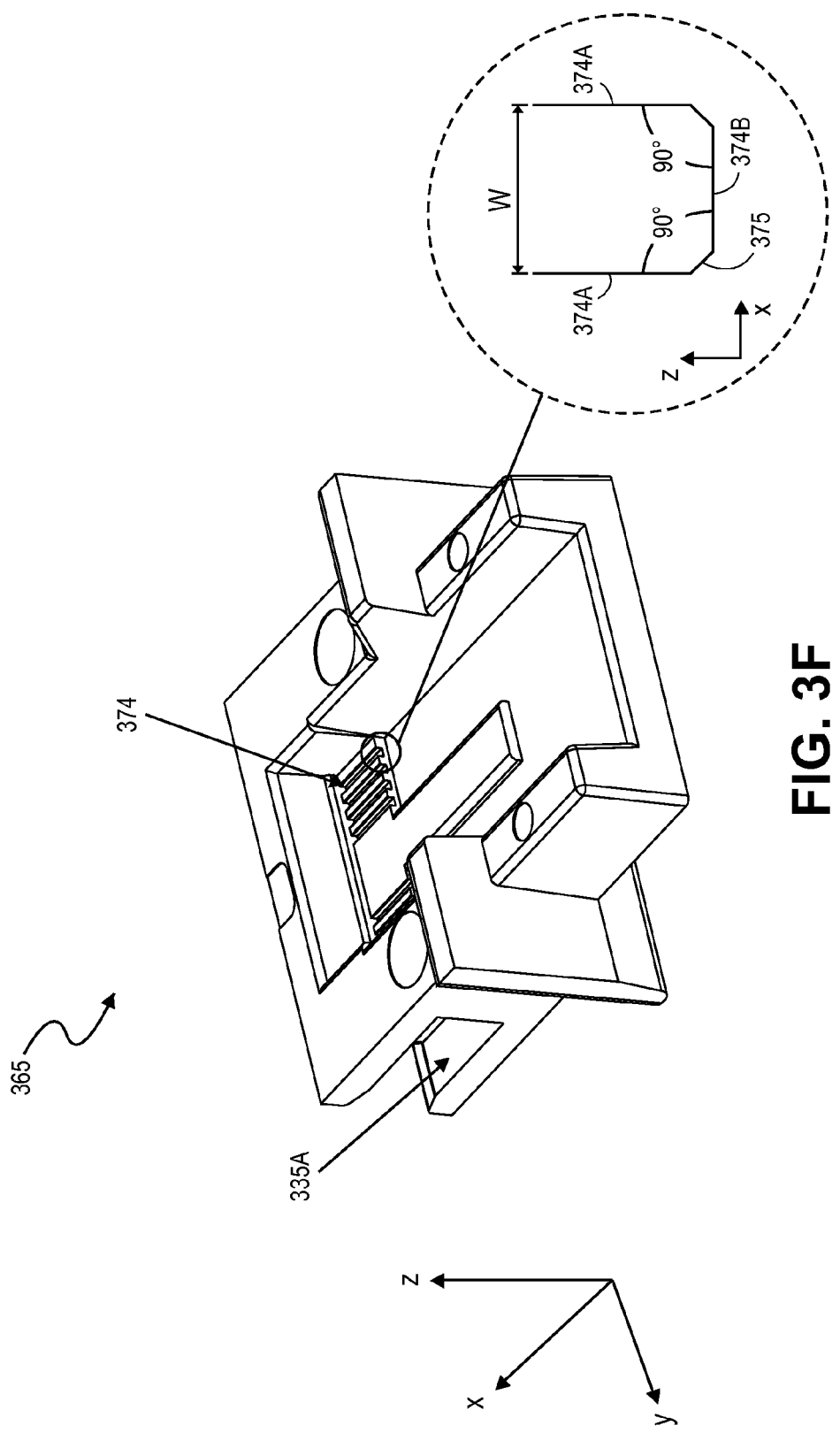
FIG. 3F is an isometric view of back surfaces of the plug lens depicted in FIG. 3D, in accordance with an embodiment.

FIG. 3F is an expanded isometric view of the back surface of the plug lens depicted in FIG. 3E, in accordance with an embodiment. On the back surface, each one of the fiber grooves 374 is to receive a single optical fiber. Each of the fiber grooves 374 is aligned with one lens of the lens arrays 321, 322. In the exemplary embodiment, as depicted in the expanded cross-sectional view, each fiber groove 374 has sidewalls 374A that are substantially orthogonal to a bottom surface 374B. A fillet 375 is disposed at an intersection of the sidewalls 374A and the bottom surface 374B. The fillet 375 is, for example, at a 45° relative to the sidewalls 374A or bottom surface 347B and on the order of a 20 μm radius. The width W of the fiber groove 374 may vary with fiber, but in the exemplary embodiment is approximately 126 μm-131 μm for application to a conventional 125 μm fiber. This "u-groove" structure has been found advantageous over conventional v-groove structures for at least the reasons that the "u-groove" enables better dimensional control and therefore greater fiber positional control. Rather than having a v-groove that permits a fiber to self-center at a height dependent on a variable slope, precise dimensions are achieved for the u-groove and the fiber is brought into contact with the bottom surface 347B that is of a well-controlled position relative to the lens arrays 321, 322. Fibers of the raw cable assembly 232 are abutted against the back side of the face of the jumper lens 365 and affixed, for example by glue, within the fiber grooves 374. A fiber cover (not depicted) is then secured, for example by glue, to prevent fiber dislocation.

Figure 4A:
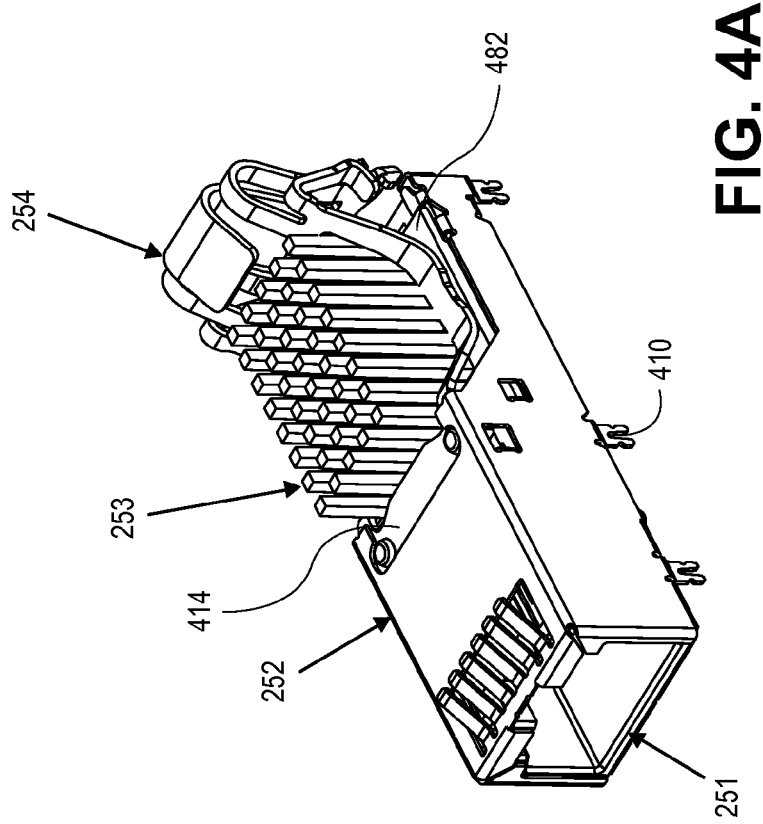
FIG. 4A is an isometric view of the edge mount optical transceiver assembly depicted in FIG. 2, in accordance with an embodiment.
Figure 4A:
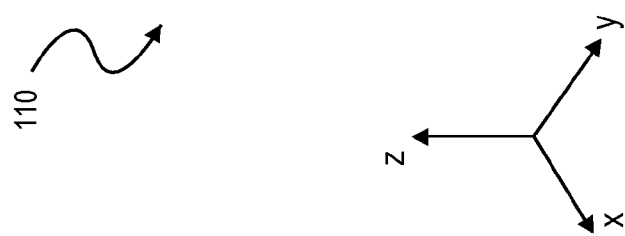

FIG. 4A is an isometric front side view of external surfaces of an edge mount optical transceiver assembly 110 (e.g., 110A or 110B as depicted in FIG. 2), in accordance with an embodiment. Generally, the edge-mount housing 251 and outer shield 252 are to be installed as a single piece onto a PCB with mounts 410 then secured through solder (e.g., IR reflow). The outer shield 252 further secures the socket latch 254 cantilevered from the spring anchor 414. A transceiver module is then installed, either as a subsequent operation in product assembly or in the field, into socket contacts of the edge-mount housing 251, followed by installation of the heat sink 253 disposed in contact with an exposed surface of the socketed transceiver module. The socket latch 254 then secures the heat sink and transceiver module.

Figure 4B:
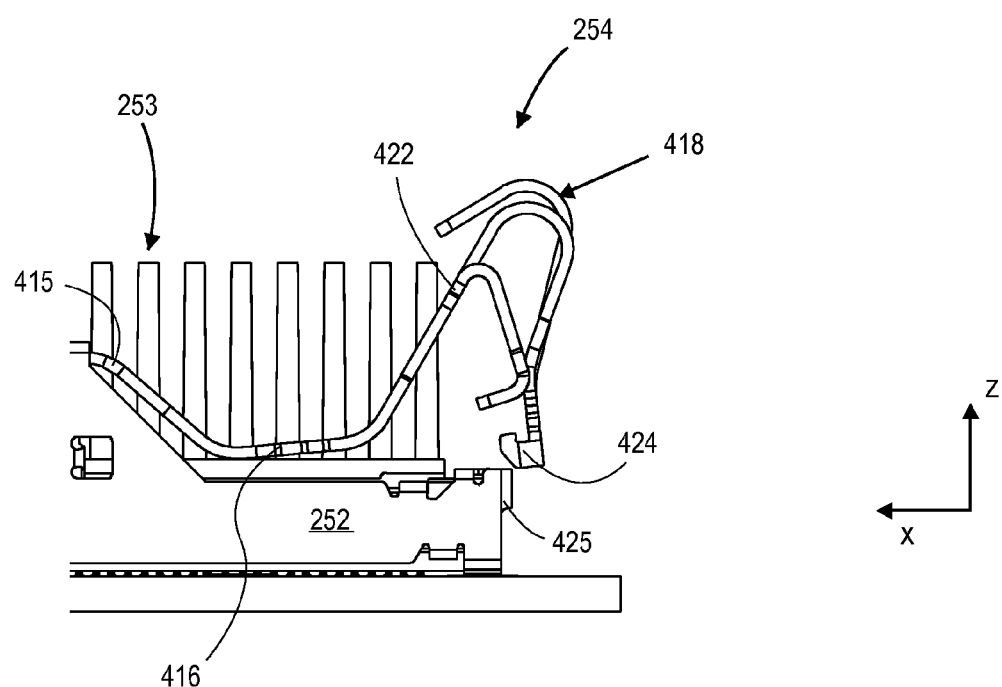
FIG. 4B is a side view of the edge mount optical transceiver assembly depicted in FIG. 2, in accordance with an embodiment.
Figure 4C:
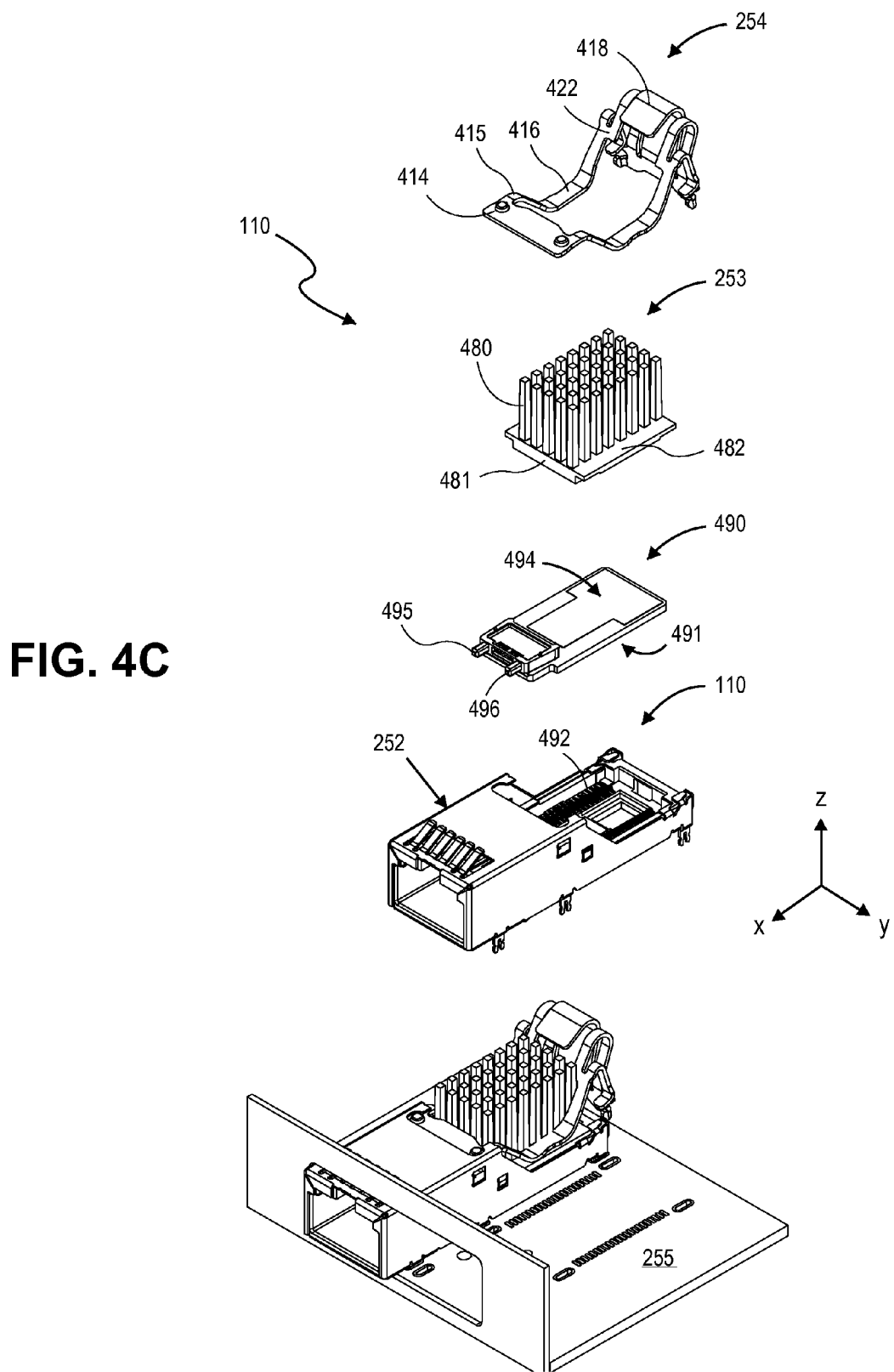
FIG. 4C is an exploded view of the edge mount optical transceiver assembly depicted in FIG. 2, in accordance with an embodiment.

FIG. 4B is a side view of external surfaces of the edge mount optical transceiver assembly 110, in accordance with an embodiment while FIG. 4C is an exploded isometric front top and side view of the edge mount optical transceiver assembly depicted in FIG. 2, in accordance with an embodiment. As visible in both FIGS. 4B and 4C, the socket latch 254 includes a handle 418, a spring anchor 414 coupled through a first flexural member 415 to a spring load application surface 416, that is further coupled through a secondary flexural member 422 to a latching surface 424. In the exemplary embodiment the socket latch 254 is a single piece of stamped steel. With the spring seat 414 affixed to the outer shield 252, a downward force (i.e., along z-axis directed toward PCB 255 in FIG. 4C) applied through the handle 418 strains the first flexural member 415 until the spring load application surface 416 is brought to bear on a surface of the heat sink 253. With the spring load application surface 416 in contact with the heat sink 253, downward force applied to the handle 418 applies torque to the second flexural member 422 inducing torsional strain (i.e., twist) to provide lateral (x-axis) clearance between the latching surface 424 beyond an edge of the keeper surface 425.

As further shown in FIG. 4C, the heat sink 253 includes heat dissipation features (e.g., high surface are fins or columns) 480 disposed on a base 481. In the exemplary embodiment, the heat sink 253 is a single piece of zinc, copper, aluminum, etc. A flange 482 extends laterally (along the y-axis) beyond edges of the base 481 and area occupied by the columns 480. As shown in FIGS. 4A and 4B, the spring load application surface 416 makes contact with the flange 482 on opposite sides of the heat dissipation features 480 such that the cantilevered portion of the socket latch 254 straddles the heat dissipation features 480. A pair of spring load application surfaces 416 then maintain the heat sink 253 centered relative the longitudinal axis (x-axis in FIG. 4A) of the edge-mount housing 251. When loaded, the socket latch 254 applies a spring force downward (along the z-axis) to the flange 482.

The optical transceiver (DCO) module 490 is also shown in FIG. 4C. The optical transceiver module 490 is to perform electrical-to-optical (E2O) conversion, etc. in any manner known in the art. On the top surface of the optical transceiver module 490 is a thermal interface pad 494 to make contact with the heat sink base 481. The optical transceiver module 490 further includes electrical contacts (e.g., pads, pins, etc.) on a bottom surface 491. These electrical contacts are to make contact with the socket contacts 492 disposed in the edge mount housing 251 in response the socket latch 254 spring force transmitted through the heat sink flange 482 and further through the base 481 and thermal interface pad 494 to the optical transceiver module 490. The top-side socket contacts 492 include a plurality of high-speed and/or low-speed electrical signaling with one end of the socket contacts 492 soldered to the PCB 255 (e.g., IR reflowed). When spring load is applied by the latch 254, the optical transceiver module 490 is rigidly retained against a plane defined by the socket contacts 492. At a front end of the optical transceiver module 490 are alignment posts 495, 496 that are male members to mate with the female alignment features 335 present in the plug lens 365. As illustrated in FIG. 4C, the alignments posts 495, 496 are rectangular or square with the post surfaces flat and substantially orthogonal to sit flush against the alignment feature surfaces 335A, 335B and 335C depicted in FIG. 3E.

Figure 5:
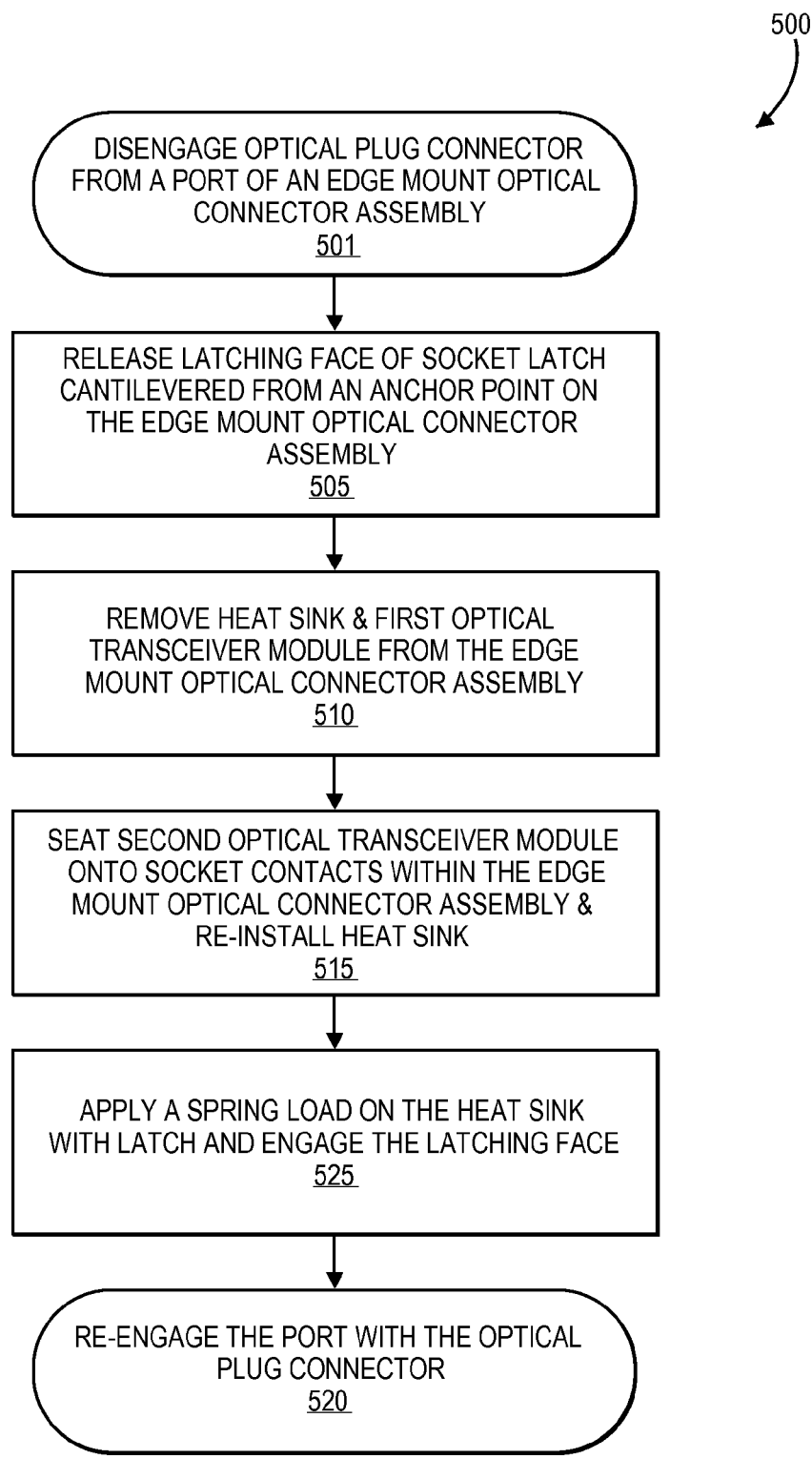
FIG. 5 is a flow chart illustrating a method of servicing an edge mount optical connector assembly, in accordance with an embodiment.

Although rigidly fixed in place by the latch 254, the optical transceiver module 490 is removable for servicing. FIG. 5 is a flow chart illustrating a method 500 of servicing an edge mount optical connector assembly, in accordance with an embodiment. At operation 501, an optical plug connector is disengaged from a port of the edge mount optical connector assembly. At operation 505, the latching face of socket latch cantilevered from an anchor point on the edge mount optical connector assembly is released. In embodiments, de-latching operation 505 comprises straining of the second flexural member 422 to release the latching face 424 from the keeper surface 425 while a concurrent relaxing of the strain on the first flexural member 415 removes downward force from the heat sink flange 482. At operation 510, the heat sink 253 is lifted from the assembly 110. Upon removal of the heat sink 253, the optical transceiver module 490 can be extracted from the edge-mount housing 251, for example with an upward prying from the rear of the edge-mount housing 251 followed by displacement of the optical transceiver module 490 along the x-axis toward the rear of the edge-mount housing 251 opposite the plug port.

At operation 515, a second optical transceiver module is seated onto socket contacts within the edge mount optical connector assembly. The heat sink 253 is then placed onto the optical transceiver module 490. At operation 520, force is applied to the handle 418 to strain the first flexural member 415 placing a downward force on the heat sink flange 482. The second flexural member 422 is then strained by torsional force applied to the handle 418 while maintaining strain on the first flexural member 415 to extend the latching surface 424 past the keeper surface 425. Spring torque then holds the latching surface 424 against the keeper surface 425 in absence of force applied to the handle 418. Completing the method 500, the port is re-engaged with the optical plug connector at operation 520.

It is to be understood that the above description is intended to be illustrative, and not restrictive. For example, while flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. An edge mount optical connector assembly, comprising:
    an edge-mount housing including top side socket contacts proximate to a first end of the housing and a port at a second end, opposite the first, to receive an optical plug connector;
    an outer shield wrapping around at least a top surface of edge-mount housing between the first and second housing ends;
    a socket latch cantilevered from an anchor point coupled to the housing, the socket latch including:
        a latching face to contact a keeper face associated with the housing; and
        a spring load application surface between the anchor point and the latching face to apply a spring force in against the electrical contacts; and
    an optical transceiver module to covert between optical signals passing through the port and electrical signals passing through the socket contacts, wherein the optical transceiver module includes bottom side electrical contacts to make physical contact with the top side socket contacts; and
    a heat sink comprising a bottom-side to make contact with a top side of the optical transceiver module, and heat dissipation features, wherein the socket latch further comprises a pair of the spring load application surfaces straddling the heat dissipation features, with each of the spring load application surfaces to apply the spring force.

2. The edge mount optical connector assembly of claim 1, wherein the optical transceiver module further comprises at least two alignment posts proximate to the first end of the housing to align with alignment features in the optical plug connector when engaged in the port, and wherein at least one of the alignment posts further comprises at least a pair of flats surfaces oriented orthogonally to each other.

3. The edge mount optical connector assembly of claim 1, wherein the socket latch is to contact the heat sink with the spring load application surface and apply the spring force to both the heat sink and the optical transceiver module.

4. The edge mount optical connector assembly of claim 1, further comprising a printed circuit board soldered to first ends of the socket contacts.

5. An edge mount optical connector assembly, comprising:
   an edge-mount housing including top side socket contacts proximate to a first end of the housing and a port at a second end, opposite the first, to receive an optical plug connector;
   an outer shield wrapping around at least a top surface of edge-mount housing between the first and second housing ends;
   a socket latch cantilevered from an anchor point coupled to the housing,
   the socket latch including:
      a latching face to contact a keeper face of the housing; and
      a spring load application surface between the anchor point and the latching face to apply a spring force against the electrical contacts; and
   an optical plug connector assembly, wherein the optical plug connector assembly further comprises
      a front housing joined to a rear housing;
      a plug lens disposed within the front or rear housing, wherein the plug lens comprises an array of lenses disposed in a front face between two alignment features, at least one of the alignment features comprising two flat alignment surfaces orthogonally oriented relative to each other;
      a plurality of optical fibers extending from a raw cable assembly and through the rear housing and affixed to the plug lens; and
      a coil spring, wherein the plurality of optical fibers pass through turns of the spring and wherein the coil spring is compressed between the plug lens and the rear housing.

6. The edge mount optical connector assembly of claim 5, further comprising:
   an optical transceiver module to covert between optical signals passing through the port and electrical signals passing through the socket contacts, wherein the optical transceiver module includes bottom side electrical contacts to make physical contact with the top side socket contacts.

7. The edge mount optical connector assembly of claim 6, wherein the optical transceiver module further comprises at least two alignment posts proximate to the first end of the housing to align with alignment features in the optical plug connector when engaged in the port, and wherein at least one of the alignment posts further comprises at least a pair of flats surfaces oriented orthogonally to each other.

8. The edge mount optical connector assembly of claim 6, further comprising:
   a heat sink comprising a bottom-side to make contact with a top side of the optical transceiver module, and heat dissipation features, wherein the socket latch is to contact the heat sink with the spring load application surface and apply the spring force to both the heat sink and the optical transceiver module.

9. The edge mount optical connector assembly of claim 6, wherein the socket latch further comprises a pair of the spring load application surfaces straddling the heat dissipation features, with each of the spring load application surfaces to apply the spring force.

10. The edge mount optical connector assembly of claim 6, further comprising a printed circuit board soldered to first ends of the socket contacts.

* * * * *